Figure 1:
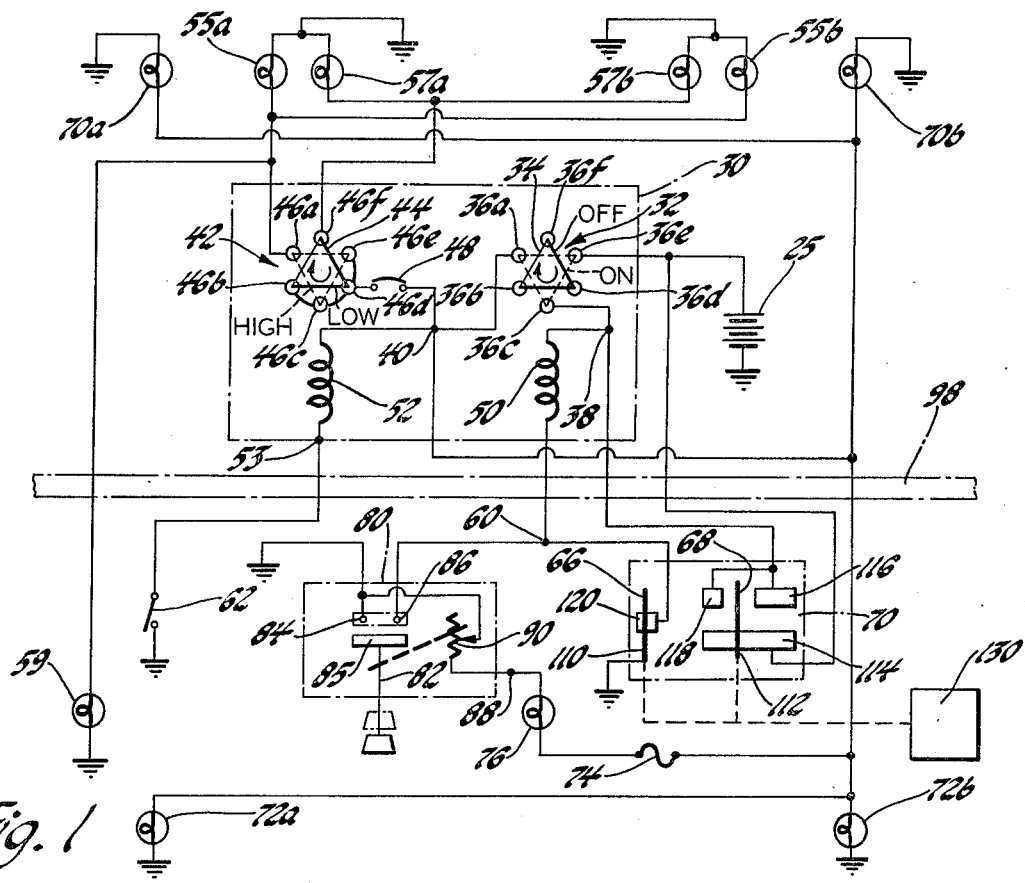

United States Patent [19]

Jones et al.

[11] 4,208,615
[45] Jun. 17, 1980

[54] AUTOMATIC HEADLAMP CONTROL SYSTEM

[75] Inventors: Billy R. Jones, Anderson; John J. Sheridan, Middletown, both of Ind.

[73] Assignee: General Motors Corporation, Detroit, Mich.

[21] Appl. No.: 14,309

[22] Filed: Feb. 23, 1979

[51] Int. Cl.² ............................................. B60Q 1/04
[52] U.S. Cl. ........................................ 315/83; 315/82
[58] Field of Search ................ 307/10 LS; 315/82, 83

[56] References Cited

U.S. PATENT DOCUMENTS

| | | | |
|---|---|---|---|
| 2,283,630 | 5/1942 | Hill | 200/11 G |
| 3,349,281 | 10/1967 | Collins | 315/83 |
| 3,686,506 | 8/1972 | Offner | 315/83 X |
| 3,748,529 | 7/1973 | Ballou | 315/83 |
| 3,769,519 | 10/1973 | Adamian | 315/83 X |
| 3,774,071 | 11/1973 | Goodrich | 315/82 |
| 3,818,267 | 6/1974 | Hill et al. | 315/82 |
| 3,881,128 | 4/1975 | Douglas et al. | 315/83 |
| 3,882,452 | 5/1975 | Stevens | 315/77 X |
| 3,909,661 | 9/1975 | Grossenbacher | 315/82 |
| 3,993,914 | 11/1976 | Conrad et al. | 315/82 X |

Primary Examiner—Alfred E. Smith
Assistant Examiner—Charles F. Roberts
Attorney, Agent, or Firm—C. R. Meland

[57] ABSTRACT

A motor vehicle headlamp control system wherein a two-position solenoid operated ratcheting switch conducts current from the storage battery to the headlamps. The position of the switch controls the energization of the headlamps and momentary energization of the solenoid changes the position of the switch. The driver may manually energize the solenoid to control the headlamps and the switch is automatically shifted to a position to deenergize the headlamps when the vehicle ignition key is shifted to an "off" position. Automatic turn-on and delayed turn-off functions are also provided.

4 Claims, 2 Drawing Figures

AUTOMATIC HEADLAMP CONTROL SYSTEM

This invention relates to a circuit for controlling the energization of motor vehicle headlamps. More particularly, this invention relates to a headlamp control circuit whereby the headlamps are automatically deenergized when the ignition switch of the vehicle is turned to an "off" position.

The storage battery of a motor vehicle can be severely discharged and rendered inoperative due to driver neglect in failing to turn off the headlamps before leaving the vehicle. This problem has been recognized and many devices have been designed to automatically turn off the headlamps upon a variety of conditions that indicate that the driver is about to leave the vehicle. Such prior art designs have several shortcomings including excessive power consumption in the control circuit, unduly complicated circuitry, and inconvenient or undesirable operation.

It is accordingly an object of this invention to provide a simple, low power headlamp control circuit that automatically turns off the headlamps when the vehicle ignition switch is turned to an "off" position.

It is a further object of this invention to provide a headlamp control circuit that requires only a momentary pulse of control current to energize or deenergize the headlamps.

In carrying these objects forward, there is provided a two-position solenoid-operated ratcheting switch for conducting headlamp current, wherein momentary energization of the solenoid coil changes the position of the switch. In one position, the headlights are off and in the other position, the headlights are on and battery voltage is connected to a control terminal. Manual on/off control is provided when the ignition switch is in a position other than an "off" position by a circuit comprising the vehicle battery, a first ignition operated control switch, the solenoid coil, and a manually operated momentary contact switch. Automatic deenergization of the headlamps when the ignition switch is shifted to an "off" position is provided by a circuit comprising the control terminal, the solenoid coil, and a second ignition operated control switch.

IN THE DRAWINGS

Figure 2:
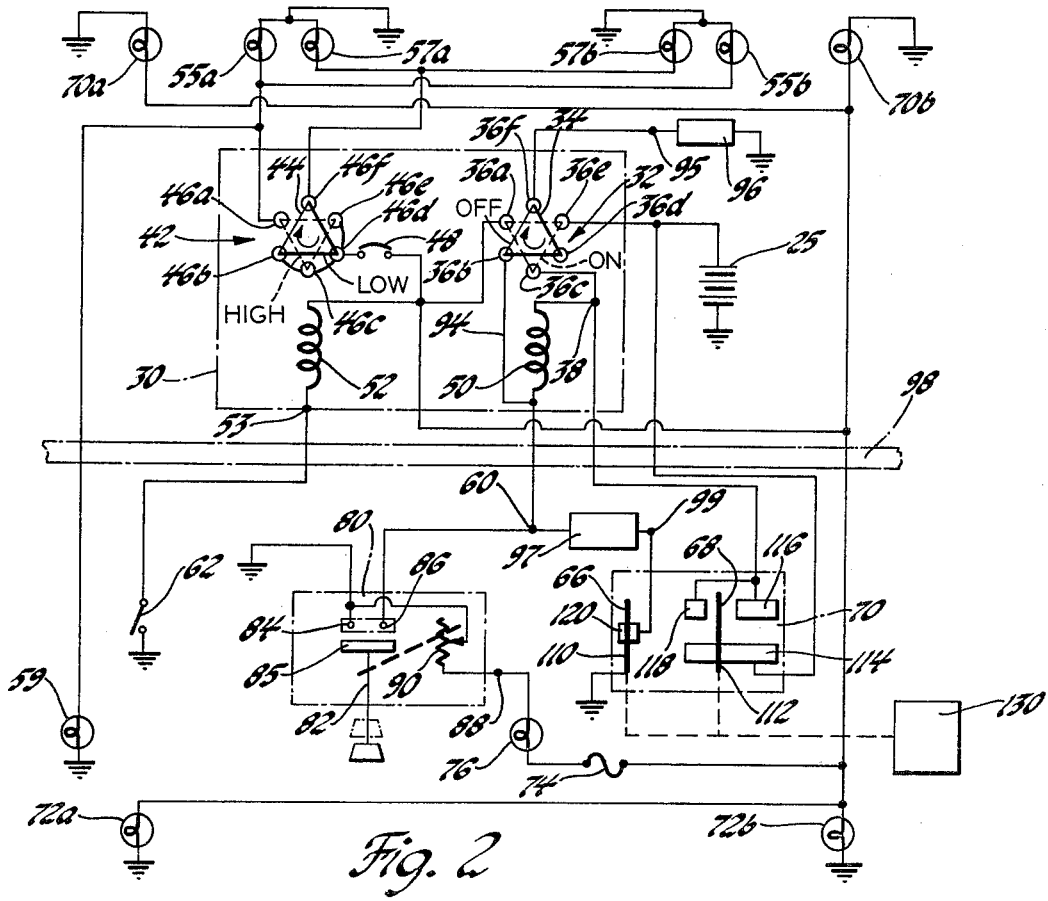

FIG. 1 is a circuit diagram of a first embodiment of a headlamp control circuit made in accordance with this invention; and FIG. 2 is a circuit diagram of a second embodiment of a headlamp control circuit made in accordance with this invention.

Referring now to the drawings, and more particularly to FIG. 1, reference numeral 30 generally designates an enclosure containing two solenoid-operated ratcheting switches 32 and 42. Each switch has six fixed contacts and a triangular movable contactor that may be shifted to one of two positions as indicated. Ratcheting switches 32 and 42 may be of the type disclosed in the U.S. Patent to Hill No. 2,283,630, slightly modified to receive the plunger from a solenoid instead of a manually operated mechanism. Momentary energization of solenoid coil 50 operates a plunger (not shown) to shift the position of movable contactor 34 and momentary energization of solenoid coil 52 operates a plunger (not shown) to shift the position of movable contactor 44. The plungers are urged to a deenergized position by resilient means, not illustrated. Each time a solenoid coil is energized, the movable contactor associated with that coil is shifted from its instant position to the other position.

When contactor 34 of switch 32 is shifted to the "on" position, (shown by broken lines) the positive terminal of storage battery 25 is connected through contact 36e to contacts 36a and 36c. When shifted to the "off" position, (shown by solid lines) storage battery 25 is connected only to contact 36e. The negative terminal of storage battery 25 is connected to ground potential. Contact 36a is further connected to terminal 40 and contact 36c is further connected to terminal 38. Terminal 40 is connected to parking lamps 70a and 70b and tail lamps 72a and 72b so that these lamps will be energized whenever contactor 34 is in the "on" position. Contacts 36b, 36d and 36f are not necessary for this embodiment.

Switch 42 functions as a dimmer switch, enabling the operator to selectively energize either the high beam headlamps or the low beam headlamps. When movable contactor 44 of switch 42 is shifted to the "high" position, (shown by broken lines) terminal 40 is connected through circuit breaker 48 to contacts 46a, 46b, 46c, 46d and 46e. When shifted to the "low" position, (shown by solid lines) terminal 40 is connected through circuit breaker 48 to contacts 46b, 46c, 46d, 46e and 46f. Contact 46f is further connected to low beam headlamps 57a and 57b and contact 46a is further connected to high beam headlamps 55a and 55b and to high beam indicator lamp 59. One side of solenoid coil 50 is connected to terminal 38 and the other side is connected to terminal 60. One side of solenoid coil 52 is connected to terminal 40 and the other side is connected to terminal 53.

Switch 62 is interposed between terminal 53 and ground potential so that the operator may energize solenoid coil 52 to shift the position of movable contactor 44 by momentarily closing the switch when the headlamps are on. When the headlamps are off, solenoid coil 52 cannot be energized as storage battery 25 is disconnected from terminal 40.

Reference numeral 70 generally refers to an enclosure containing control switches 66 and 68 that open or close in response to the position of vehicle ignition switch 130. Switch 66 comprises stationary contact 120 and movable contact bar 110; switch 68 comprises stationary contacts 114, 116 and 118 and movable contact bar 112. Movable contact bars 110 and 112 move together in response to the shiftable movement of vehicle ignition switch 130, as indicated across stationary contacts 114, 116, 118, and 120. Contact 114 is connected to the positive terminal of storage battery 25 and contact bar 110 is connected to ground potential. Contacts 116 and 118 are connected to terminal 38, and contact 120 is connected to terminal 60. When vehicle ignition switch 130 is in an "off" position (allowing the operator to remove the ignition key) contact bars 110 and 112 are positioned as shown in FIGS. 1 and 2. In this position, contact 120 is connected to ground potential by contact bar 110 and contacts 116 and 118 are open. When vehicle ignition switch 130 is shifted to any other position (accessory, on, crank, etc.) contact 116 or 118 is connected to positive battery voltage by contact bar 112, and contact 120 is open. The contact bars are shifted to the left for an "accessory" position and to the right for "on" and "crank" positions. The relative size and location of the contacts and contact bars is such that when vehicle ignition switch 130 is shifted to an "off" position, switch 68 is opened before 66 is closed so that terminal 38 is disconnected from battery voltage before terminal 60 is connected to ground potential. Similarly, when vehicle ignition switch 130 is shifted from the "off" position to any other position, switch 66 is opened before switch 68 is closed so that terminal 60 is disconnected from ground potential before terminal 38 is connected to battery voltage. The need for the above described switching sequence will be later discussed.

It should be apparent that the above described sliding contacts are but one way to perform the function of control switches 66 and 68, and, accordingly, this invention is not thereby limited.

Reference numeral 80 generally designates a momentary contact headlamp control switch. When plunger 82 of switch 80 is depressed, shorting bar 85 connects terminal 86, which is connected to terminal 60, to terminal 84, which is connected to ground potential. Resilient means, not shown, urge plunger 82 in the opposite, released position, as shown with solid lines. The switch position shown by broken lines indicates the depressed position. Rotation of plunger 82 controls the position of the tap of potentiometer 90 (as indicated) through which terminal 88 is connected to ground potential. Terminal 88 is further connected through panel lamp 76 and fuse 74 to terminal 40 so that when the headlamps are on, the operator may vary the intensity of panel lamp 76 by rotating plunger 82 of headlamp switch 80.

Reference numeral 98 designates the firewall of the motor vehicle, separating the passenger compartment from the front or engine compartment. Firewall 98 is so illustrated to show that the headlamp current carrying devices (switches 32 and 42) need not be located near the headlamp switch in the passenger compartment. Consequently, a small, low current capacity conductor may be used in the passenger compartment.

FIG. 2 illustrates a headlamp control circuit made in accordance with this invention and having automatic turn-on and delayed turn-off capabilities. The reference numerals used in the FIG. 1 are also used in FIG. 2 to identify identical circuit elements.

Automatic turn-on capability is provided by circuit 96 which is interposed between terminal 36f and ground potential, and by conductor 94 which connects terminal 36b to terminal 60. Circuit 96 operates to momentarily connect terminal 36f to ground potential when the ambient light level falls to a predetermined low level. This circuit may comprise, as will be apparent to those skilled in the art, a photo sensitive circuit similar to that disclosed in the U.S. Patent to Collins No. 3,349,281, except that the conductive path from terminal 95 to ground potential is only momentarily provided when the ambient lighting conditions reach the predetermined level. When contactor 34 is shifted to the "off" position, terminal 95 is connected through terminals 36f and 36b and conductor 94 to terminal 60. When contactor 34 is in the "on" position, terminal 95 is disconnected from terminal 60.

Automatic turn-off delay is provided by interposing circuit 97 between terminal 60 and switch 66. Circuit 97 operates to momentarily connect terminal 60 to ground potential following a time delay initiated by the closing of switch 66. This circuit, as will also be apparent to those skilled in the art, may comprise timing circuitry similar to that disclosed in the above referenced patent to Collins responsive to the connection of ground potential to terminal 99, that, after a fixed or adjustable delay period, momentarily provides a conductive path between terminal 60 and ground potential.

The remaining circuit elements illustrated in FIG. 2 are identical to those illustrated and described in reference to FIG. 1.

The operation of the headlamp control system as illustrated in the drawing figures will now be described. When vehicle ignition switch 130 is in an "off" position, contactor 34 of switch 32 cannot be shifted to the "on" position as there is no conductive path through switch 68 to energize solenoid coil 50. Furthermore, solenoid coil 52 cannot be energized since terminal 40 is disconnected from storage battery 25. When vehicle ignition switch 130 is shifted to a position other than the "off" position, switch 68 closes, connecting the positive terminal of storage battery 25 to terminal 38. At the same moment or slightly beforehand, switch 66 opens so that solenoid coil 50 is not immediately energized. By momentarily depressing plunger 82 of headlamp switch 80 the driver of the vehicle may momentarily energize solenoid coil 50, shifting contactor 34 to the "on" position to turn on the headlamps. The energization path is from the positive terminal of storage battery 25, to switch 68, to terminal 38, to solenoid coil 50, to terminal 60, to terminal 86, to shorting bar 85, to terminal 84, to ground potential and the negative terminal of storage battery 25. Storage battery 25 is thereby connected to parking lamps 70a and 70b, tail lamps 72a and 72b, and either high beam headlamps 55a and 55b, or low beam headlamps 57a and 57b. The driver may then momentarily close switch 62 energizing solenoid coil 52 to shift the position of contactor 44 of switch 42. The driver may thereby alternately energize the high beam headlamps 57a and 57b or the low beam headlamps 55a and 55b. High beam indicator 59 is energized along with high beam headlamps 55a and 55b to so inform the driver. The driver may repeatedly depress plunger 82 of switch 80 to thereby manually control the energization of the vehicle lamps. When vehicle ignition switch 130 is shifted to the "off" position, switch 66 closes, applying ground potential to terminal 60. At the same moment or slightly beforehand, switch 68 opens so that solenoid coil 50 is not energized through switches 66 and 68. However, since the headlamps are energized, an energization path for solenoid coil 50 is automatically provided comprising: storage battery 25, contacts 36e and 36c, terminal 38, solenoid coil 50, terminal 60 and switch 66. Solenoid coil 50 is thus momentarily energized to shift the position of contactor 34 to the "off" position, deenergizing all vehicle lamps and interrupting the solenoid energization path. If the headlamps are deenergized when vehicle ignition switch 130 is shifted to the "off" position, no energization path is provided for solenoid coil 50. When vehicle ignition switch 130 is returned to a position other than the "off" position, all of the vehicle lamps remain deenergized whether they were the last deenergized manually or automatically.

The automatic turn-on circuit 96 illustrated in FIG. 2 operates to momentarily energize solenoid coil 50 if three conditions are met: vehicle ignition switch 130 must be shifted to a position other than the "off" position; contactor 34 must be shifted to the "off" position; and the ambient light level must be below the predetermined level. The automatic turn-on energization path comprises: circuit 96, contacts 36f and 36b, conductor 94, solenoid coil 50, terminal 38, switch 68, and storage battery 25.

The turn-off delay circuit 97 cooperates with the above-described automatic turn-off circuit as follows. When ignition switch 130 is shifted to the "off" position a time delay is initiated in circuit 97. At the end of the time delay, circuit 97 momentarily connects terminal 60 to ground potential. If the headlamps are on, solenoid coil 50 will be momentarily energized to turn the headlamps off through the circuit path comprising: storage battery 25, contacts 36e and 36c, terminal 38, solenoid coil 50, terminal 60, circuit 97 and ground potential. Were the headlamps off, no energization path would be provided across contacts 36e and 36c. The time delay may be fixed or adjustable, as will be known to those skilled in the art of electronics.

As indicated above, solenoid coil 50 is never energized through switches 66 and 68 simultaneously; the two switches are never closed at the same time. This switching arrangement is necessary to avoid unwanted energization of the headlamps. Otherwise, solenoid coil 50 would be energized to shift the position of contactor 34 whenever vehicle ignition switch 130 was shifted to or from the "off" position. However, when switches 66 and 68 operate in the desired sequence (described in reference to FIG. 1) the headlamps are energized and deenergized in a convenient manner as above described.

It should be noted that only momentary pulses of control current are needed to control the energization of the vehicle lamps. Contactor 44 of switch 42 may be shifted by a manually operated plunger if desired. Also headlamp switch 80 may have another position for energizing the parking lamps and tail lamps alone if desired.

The embodiments of the invention in which an exclusive property or privilege is claimed are defined as follows:

1. A system for controlling the energization of motor vehicle headlamps comprising, a source of voltage, headlamps for said motor vehicle, a headlamp control switch for controlling the energization of said headlamps from said voltage source having a first position in which the headlamps are deenergized, and a second position in which said headlamps are energized and in which the headlamp control switch connects one terminal of said source of voltage to a control terminal, electrically energizable means for shifting said control switch between said first and second positions each time said electrically energizable means is energized, first and second control switches operated in response to the position of a vehicle ignition switch such that when said vehicle ignition switch is in an off position said first control switch is opened and said second control switch is closed, said first control switch being closed and said second control switch being open when said ignition switch is in a position other than said off position, a manually operable momentary switch means, a first circuit for providing manual on/off control of said headlamps comprising said source of voltage, said first control switch, said electrically energizable means, and said momentary switch means, whereby the position of said headlamp control switch is shifted each time said momentary switch means is temporarily closed when said vehicle ignition switch is in a position other than said off position, and a second circuit for automatically shifting said headlamp control switch to said first position if said switch is not in said first position when said ignition switch is shifted to an off position, said second circuit comprising said second control switch, said control terminal, and said electrically energizable means.

2. A system for controlling the energization of motor vehicle headlamps comprising, a source of voltage, headlamps for said motor vehicle, a headlamp control switch for controlling the energization of said headlamps from said voltage source having a first position in which the headlamps are deenergized, and a second position in which said headlamps are energized and in which the headlamp control switch connects one terminal of said source of voltage to a control terminal, electrically energizable means for shifting said control switch between said first and second positions each time said electrically energizable means is energized, first and second control switches operated in response to the shiftable position of a vehicle ignition switch such that when said vehicle ignition switch is shifted to an off position, said first control switch is opened and said second control switch is subsequently closed, said second control switch being opened and said first control switch being subsequently closed when said ignition switch is shifted to a position other than said off position, a manually operable momentary switch means, a first circuit for providing manual on/off control of said headlamps comprising said source of voltage, said first control switch, said electrically energizable means, and said momentary switch means, whereby the position of said headlamp control switch is shifted each time said momentary switch means is temporarily closed when said vehicle ignition switch is in a position other than said off position, and a second circuit for automatically shifting said headlamp control switch to said first position if said switch is not in said first position when said ignition switch is shifted to an off position, said second circuit comprising said second control switch, said control terminal, and said electrically energizable means.

3. A system for controlling the energization of motor vehicle headlamps comprising, a source of voltage, headlamps for said motor vehicle, a headlamp control switch for controlling the energization of said headlamps from said voltage source having a first position in which the headlamps are deenergized, and a second position in which said headlamps are energized and in which the headlamp control switch connects one terminal of said source of voltage to a control terminal, electrically energizable means for shifting said control switch between said first and second positions each time said electrically energizable means is energized, first and second control switches operated in response to the position of a vehicle ignition switch such that when said vehicle ignition switch is in an off position said first control switch is opened and said second control switch is closed, said first control switch being closed and said second control switch being open when said ignition switch is in a position other than said off position, a manually operable momentary switch means, delay means responsive to the closing of said second control switch, said delay means being operative to momentarily provide a conductive path therethrough following a time delay, light sensitive means operative to momentarily provide a conductive path therethrough when ambient light falls below a predetermined level, a first circuit for providing manual on/off control of said headlamps comprising said source of voltage, said first control switch, said electrically energizable means, and said momentary switch means, whereby the position of said headlamp control switch is shifted each time said momentary switch means is temporarily closed when said vehicle ignition switch is in a position other than said off position, a second circuit for automatically shifting said headlamp control switch to said first position upon the expiration of a time delay commencing when said ignition switch is shifted to an off position, said second circuit comprising said second control switch, said delay means, said control terminal, and said electrically energizable means, and a third circuit for automatically shifting said headlamp control switch to said second position when said ignition switch is shifted to a position other than an off position and the ambient light falls below a predetermined level, said third circuit comprising said source of voltage, said first control switch, said electrically energizable means, and said light sensitive means.

4. A system for controlling the energization of motor vehicle headlamps comprising, a source of voltage, headlamps for said motor vehicle, a headlamp control switch for controlling the energization of said headlamps from said voltage source comprising a shiftable contactor and at least first, second and third fixed contacts, said contactor in a first position electrically connecting said first, second and third fixed contacts and in a second position being disconnected therefrom, electrically energizable means for shifting said contactor between said first and second positions and vice versa each time it is energized, means connecting said first fixed contact to said source of voltage, means connecting said second fixed contact to said headlamps, first and second control switches operated in response to the position of a vehicle ignition switch such that when said vehicle ignition switch is in an off position said first control switch is opened and said second control switch is closed, said first control switch being closed and said second control switch being opened when said ignition switch is in a position other than said off position, a manually operable momentary switch means, a first circuit for providing manual on/off control of said headlamps comprising said source of voltage, said first control switch, said electrically energizable means and said momentary switch means, whereby the position of said shiftable contactor is shifted each time said momentary switch means is temporarily closed when said vehicle ignition switch is in the position other than said off position, and a second circuit for automatically shifting said shiftable contactor to said second position if said contactor is in said first position when said ignition switch is shifted to an off position, said second circuit comprising said source of voltage, said third fixed contact, said electrically energizable means, and said second control switch.

* * * * *